US007823458B2

(12) United States Patent
Kibblewhite et al.

(10) Patent No.: US 7,823,458 B2
(45) Date of Patent: Nov. 2, 2010

(54) SYSTEM FOR DYNAMICALLY CONTROLLING THE TORQUE OUTPUT OF A PNEUMATIC TOOL

(75) Inventors: Ian E. Kibblewhite, Wayne, PA (US); Donald E. Kotas, Blue Bell, PA (US)

(73) Assignee: Innovation Plus, LLC, King of Prussia, PA (US)

( * ) Notice: Subject to any disclaimer, the term of this patent is extended or adjusted under 35 U.S.C. 154(b) by 0 days.

(21) Appl. No.: 12/226,049

(22) PCT Filed: Apr. 6, 2007

(86) PCT No.: PCT/US2007/008539

§ 371 (c)(1), (2), (4) Date: Oct. 6, 2008

(87) PCT Pub. No.: WO2007/117575

PCT Pub. Date: Oct. 18, 2007

(65) Prior Publication Data

US 2009/0055028 A1 Feb. 26, 2009

(51) Int. Cl.
*F16B 31/02* (2006.01)

(52) U.S. Cl. .......................................... 73/761; 73/760

(58) Field of Classification Search ........... 73/760–761, 73/798, 825, 837

See application file for complete search history.

(56) References Cited

U.S. PATENT DOCUMENTS

| | | | | |
|---|---|---|---|---|
| 3,969,810 | A | 7/1976 | Pagano | |
| 4,294,122 | A | 10/1981 | Couchman | |
| 4,295,377 | A * | 10/1981 | Couchman | 73/761 |
| 4,305,471 | A * | 12/1981 | Eshghy | 73/761 |
| 5,018,988 | A | 5/1991 | Kibblewhite et al. | |
| 5,220,839 | A | 6/1993 | Kibblewhite | |
| 5,366,026 | A * | 11/1994 | Maruyama et al. | 173/180 |
| 5,439,063 | A | 8/1995 | Anders et al. | |
| 2003/0173098 | A1* | 9/2003 | Miner et al. | 173/200 |
| 2005/0161241 | A1* | 7/2005 | Frauhammer et al. | 173/1 |
| 2006/0102367 | A1* | 5/2006 | Etter et al. | 173/218 |
| 2006/0157262 | A1* | 7/2006 | Chen | 173/176 |
| 2007/0151740 | A1* | 7/2007 | Friberg et al. | 173/1 |

FOREIGN PATENT DOCUMENTS

WO WO 2005063448 7/2005

* cited by examiner

*Primary Examiner*—Max Noori
(74) *Attorney, Agent, or Firm*—Gary M. Cohen

(57) ABSTRACT

Pneumatic tightening tools can be used for high speed assembly of critical bolts to precise loads by dynamically controlling the output power of the pneumatic tool during a tightening cycle using an electronically controlled air pressure regulator to reduce the tightening rate, or the load increase per impact for impact or impulse tools, to enable the tool to be stopped precisely at a specified stopping load or torque. For prevailing torque fasteners, the output power of the pneumatic tool is dynamically controlled to minimize the speed of rotation during rundown, to minimize the heating effects associated with such torque fasteners, and to then increase the power from the tool, as required, to provide the torque to reach the specified stopping load or torque. The maximum air pressure supplied to the pneumatic tool can be limited, depending on the expected torque required to tighten the fastener to the specified load or torque.

63 Claims, 1 Drawing Sheet

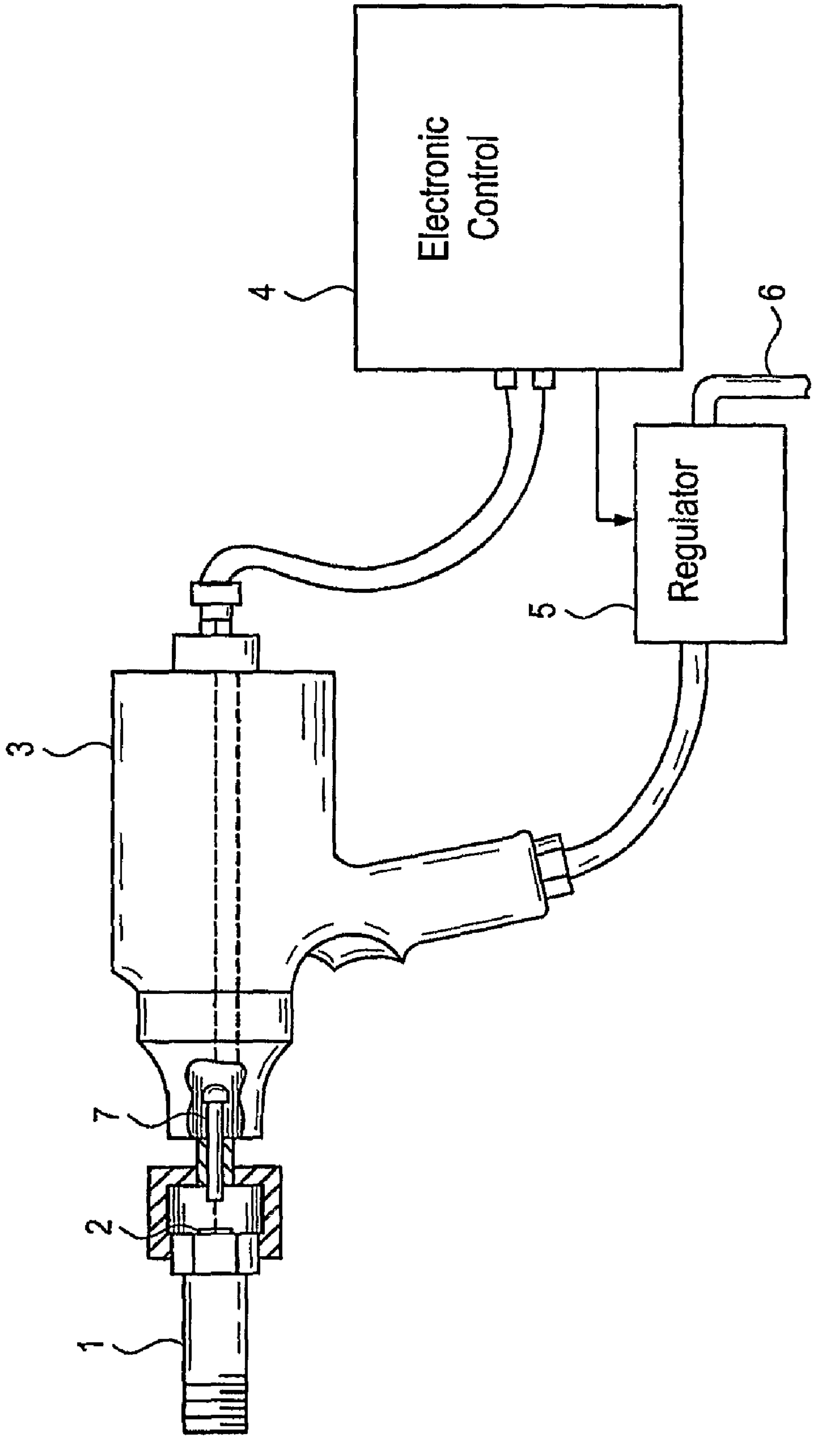
Electronic Control
Regulator
1
2
3
4
5
6
7

SYSTEM FOR DYNAMICALLY CONTROLLING THE TORQUE OUTPUT OF A PNEUMATIC TOOL

BACKGROUND OF THE INVENTION

The present invention relates to the control of torque or power from pneumatic tightening tools, and more specifically, to high speed pneumatic tools, such as impact and impulse tools, for purposes of tightening desired fasteners.

Impact and impulse tools are currently used extensively to tighten non-critical bolts in automotive and other industrial applications. Such tools provide very high torque to weight ratios, are very fast and have very low reaction torque since they effectively hammer the bolt tight. Unfortunately, however, the impacting action of the tools makes it difficult to control the tightening process since it is not possible to make accurate torque measurements, as it is with continuously operating tools. Consequently, such tools are rarely used in critical applications where bolts are required to be tightened precisely to a specified load or torque.

Techniques have been developed for performing direct load measurements in fasteners utilizing ultrasonic transducers which are removably, or preferably permanently attached to the fasteners. Examples of such techniques can be found, for example, in U.S. Pat. No. 6,990,866 (Kibblewhite); U.S. Pat. No. 6,009,380 (Vecchio et al.); U.S. Pat. No. 5,220,839 (Kibblewhite); U.S. Pat. No. 5,018,988 (Kibblewhite et al.); U.S. Pat. No. 4,899,591 (Kibblewhite); and U.S. Pat. No. 4,846,001 (Kibblewhite), each of which is incorporated by reference as if fully set forth herein. It has been found that such techniques make it possible to directly control the installation load of various different types of fasteners using all types of assembly tools, including impact and impulse tools.

Certain characteristics associated with impact and impulse tools, however, make them less desirable for use in critical applications. Firstly, if the tools are sized to tighten bolts quickly, to minimize assembly time, the angle of rotation per impact, and consequently the load increase per impact, can be large at the time that the specified load or torque is reached. Since the tools cannot be stopped during an impact, this results in significant tool overrun (i.e., final loads which exceed the specified loads), even when high speed solenoid valves are used to stop the tool.

Secondly, the rundown speed of such tools is extremely high, typically above 6,000 rpm. When these tools are used with prevailing torque lock nuts, locking fasteners or thread forming fasteners, rundown at these speeds can cause excessive localized heating in the threads of the fastener, resulting in undesirable changes in friction conditions or the degradation of friction coatings. This has been found to be common with the use of prevailing torque lock nuts in the aerospace industry, for example.

SUMMARY OF THE INVENTION

A primary objective of the present invention is to eliminate the above-mentioned undesirable characteristics of pneumatic tightening tools, allowing such tools to be used for high speed assembly of critical bolts to precise loads.

In accordance with the present invention, this is accomplished by dynamically controlling the output power of a pneumatic tool during a tightening cycle using an electronically controlled air pressure regulator to reduce the tightening rate, or the load increase per impact in the case of an impact or impulse tool, to enable the tool to be stopped precisely at a specified stopping load or torque.

In a preferred mode for torque fasteners, the output power of a pneumatic tool is dynamically controlled during the tightening cycle using an electronically controlled air pressure regulator to minimize the speed of rotation during rundown, to minimize heating effects with prevailing torque fasteners, and to then increase the power from the tool, as required, to provide the torque to reach a specified stopping load or torque.

In another preferred mode, the maximum air pressure supplied to a pneumatic tool is limited, using an electronically controlled air pressure regulator, depending on the expected torque required to tighten the fastener to a specified load or torque.

The foregoing improvements are further described with reference to the detailed description which is provided hereafter, in conjunction with the following drawing.

BRIEF DESCRIPTION OF THE DRAWING

The single FIGURE is a schematic representation of a pneumatic tool in combination with a system for dynamically controlling the output power of the pneumatic tool during a fastener tightening cycle.

DESCRIPTION OF PREFERRED EMBODIMENTS

Referring to the single FIGURE provided, a preferred embodiment of the present invention generally includes a fastener 1 which has been fitted with an ultrasonic transducer 2, a tool such as the illustrated impact wrench 3 which has been modified to measure load in the fastener 1 during tightening using the ultrasonic transducer 2, an electronic control 4 for making load measurements in the fastener 1 and for making control decisions based on the load measurements which have been made, and an electronically controlled air pressure regulator 5 associated with the supply line 6 which delivers pressurized air to the impact wrench 3 to dynamically control the air pressure supplied to the impact wrench 3 during tightening and to stop the impact wrench 3 by reducing the supplied air pressure to zero.

The fastener 1 of the preferred embodiment of the present invention is preferably a load indicating fastener with a permanent ultrasonic transducer 2, such as is described, for example, in the above-referenced U.S. Pat. No. 6,990,866; No. 5,220,839; No. 4,899,591; and No. 4,846,001. However, if desired, the fastener 1 can also be a convention fastener with a removable ultrasonic transducer suitably applied to the fastener. Although the fastener 1 selected for illustration in the drawing is a threaded bolt, it is to be understood that any of a variety of different types of fasteners can be used in accordance with the present invention, other than the fastener 1 which has been shown for illustrative purposes.

The impact wrench 3 used to tighten the load indicating fastener 1 is preferably modified with a spring biased pin 7 to permit electrical contact with the ultrasonic transducer 2 for purposes of making load measurements in the fastener 1 during tightening. Such modified tools are described, for example, in the above-referenced U.S. Pat. No. 5,018,988 and No. 4,899,591. While the impact wrench 3 has been selected for illustration in the drawing, it is to be understood that any of a variety of different types of tightening tools can be used in accordance with the present invention, other than the impact wrench 3 which has been shown for illustrative purposes.

The impact wrench 3 is electrically connected to an electronic control 4 which includes ultrasonic load measurement circuitry, as is described, for example, in the above-referenced U.S. Pat. No. 6,009,380, for purposes of making precise high speed ultrasonic load measurements in the fastener 1 during tightening, for load control purposes, as is described, for example, in the above-referenced U.S. Pat. No. 6,990,866.

The electronically controlled air pressure regulator 5 is a high-speed regulator which can preferably change the air pressure delivered to the impact wrench 3 within the amount of time available between impacts. An example of an electronically controlled air pressure regulator which can provide such a function is the PAR-15 valve manufactured by Parker Pneumatic.

In a preferred mode of operation, the electronic control 4 first establishes a maximum allowable air pressure setting for the fastener 1 being tightened based on the capacity of the tool (the impact wrench 3) and the expected maximum torque required to tighten the fastener 1. The electronic control 4 preferably continuously measures load from the load indicating fastener 1 during tightening. The electronic control 4 computes a tightening rate or an increase in load over a time interval such as, for example, an increase in load during the time for the impact tool to deliver two impacts. After each load measurement and load rate calculation, the electronic control 4 makes a decision whether to increase the air pressure, decrease the air pressure, or leave the air pressure at its current setting, based on the load measurement and load rate calculation.

If the tool is being used with prevailing torque fasteners, it can be desirable to perform the rundown of the fastener 1 at a reduced speed. In such cases, the electronic control 4 is preferably caused to operate by first adjusting the air pressure to a predetermined low pressure setting which is sufficient to rotate the fastener 1 until loading commences. As soon as loading commences, which is indicated when the measured load reaches a predetermined minimum rundown load setting, the electronic control 4 then increases the air pressure to a normal tightening pressure, such as the predetermined maximum allowable air pressure for the fastener 1.

As the tightening process continues, the electronic control 4 continuously makes load measurements and load rate calculations. Based on a comparison with an optimized load rate verses load characteristic stored for the tool type utilized (the selected impact wrench 3), the electronic control 4 increases, decreases or leaves unchanged the air pressure setting. As the tightening load approaches the stopping load, for example at 90% to 95% of the stopping load, the electronic control 4 reduces the air pressure so that the load increase per impact is minimal, for example, less that 2% of the stopping load per impact. As soon as the stopping load is reached, the air pressure is reduced to zero, stopping the tool before the next impact. Consequently, tightening overrun is minimal, i.e., less than 2% in the above example.

When the tool is required to tighten as quickly as possible, as is usually the case on automotive assembly lines, for example, and assuming there is no requirement for reduced rundown speed, then the tool preferably starts at its maximum allowable air pressure setting and the control process thereafter proceeds as previously described.

As an example of the foregoing operations, the system illustrated in the single FIGURE can be operated to tighten a fastener with a permanent ultrasonic transducer by making load measurements during tightening of the fastener with an impact wrench, and by dynamically determining the tightening load rate to be applied to the fastener by the impact wrench.

The tightening rate is measured in terms of the increase in load over a period corresponding to 2 impacts, divided by the target load for the tightened fastener, which is preferably implemented in terms of measurement updates. In the present example, the air pressure regulator can be set to one of 16 air pressure levels. A dynamic power control strategy will then be determined by one of a number of predefined power tables, which are used to determine whether to maintain, increment or decrement by 1 the air pressure setting based on load and load rate measurements. The index into the table will preferably be the current load (i.e., a 5% range), and the table will contain a minimum load rate and a maximum load rate for the load. If the load rate is less than the minimum, the air pressure setting will be incremented by 1 (up to the maximum available tightening power), and if greater, the air pressure setting will be decremented by 1. The following Table illustrates a typical predefined power table for performing the previously described dynamic power control strategy.

TABLE

| Current Load (% of target) | Table Index (% load/5) | Inc. if Rate < % Load Increase/2 Impacts | Dec. if Rate > % Load Increase/2 Impacts |
|---|---|---|---|
| 0-5 | 0 | 10 | 255 |
| 5-10 | 1 | 10 | 255 |
| 10-15 | 2 | 10 | 255 |
| 15-20 | 3 | 10 | 255 |
| 20-25 | 4 | 10 | 255 |
| 25-30 | 5 | 10 | 255 |
| 30-35 | 6 | 10 | 255 |
| 35-40 | 7 | 10 | 255 |
| 40-45 | 8 | 10 | 255 |
| 45-50 | 9 | 10 | 255 |
| 50-55 | 10 | 7 | 20 |
| 55-60 | 11 | 7 | 20 |
| 60-65 | 12 | 7 | 15 |
| 65-70 | 13 | 7 | 15 |
| 70-75 | 14 | 7 | 15 |
| 75-80 | 15 | 6 | 10 |
| 80-85 | 16 | 6 | 10 |
| 85-90 | 17 | 6 | 10 |
| 90-95 | 18 | 3 | 5 |
| 95+ | 19 | 2 | 3 |

User settings for the foregoing system can include the selection of a power table (by number), the time between impacts delivered (for example, in 10 ms increments), rundown load (% of target), rundown power setting, and maximum usable torque from the tool. Note that a maximum tightening power setting will be calculated from the maximum usable torque and the maximum torque specified for a particular application.

A fast tightening mode can be initiated at a maximum tightening power setting, with no incrementing above this level. At every measurement update (for example, 12 ms) load rate is calculated and the power setting is maintained, decremented or incremented according to the table until the target load is reached.

A slow rundown mode, for prevailing torque fasteners, can be initiated with the rundown power setting, and can proceed until the appropriate rundown load (%) is reached. At this point, the power is increased to a maximum tightening power setting and is continued as defined in the selected power table, as for the fast tightening.

It will be appreciated by one skilled in the art that the above-described method of controlling tightening rate during tightening is applicable to types of pneumatic tools other than the illustrated impact wrench 3, such as impulse tools and continuous tightening pneumatic tools. It will be further appreciated that the above-described method can be used with convention fasteners and removable ultrasonic transducers, or conventional fasteners with tools and electronic controls for measuring torque and for determining torque rate, instead of load and load rate, in a similar manner to that previously described, to minimize heating with prevailing torque fasteners or to minimize torque overrun. Accordingly, it is to be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for dynamically controlling output power of a pneumatic tool used to tighten a fastener during a tightening cycle, wherein the pneumatic tool is operated responsive to pressurized air delivered to the pneumatic tool at a supplied pressure, and wherein the apparatus comprises:

an electronic control circuit coupled with the pneumatic tool, for receiving electrical signals from the pneumatic tool for making load measurements in the fastener; and an air pressure regulator coupled with the pneumatic tool, for regulating the air pressure of the pressurized air delivered to the pneumatic tool;

wherein the electronic control circuit is coupled with the air pressure regulator for dynamically controlling the air pressure of the pressurized air delivered to the pneumatic tool during tightening of the fastener, and for stopping the pneumatic tool when the fastener has been tightened, responsive to the load measurements made in the fastener.

2. The apparatus of claim 1 wherein the pneumatic tool is a pneumatic impact tool.

3. The apparatus of claim 1 wherein the pneumatic tool is a pneumatic impulse tool.

4. The apparatus of claim 1 wherein the pneumatic tool is a continuous tightening pneumatic tool.

5. The apparatus of claim 1 which further includes a threaded fastener coupled with the pneumatic tool.

6. The apparatus of claim 5 wherein the threaded fastener is a threaded bolt.

7. The apparatus of claim 5 wherein the threaded fastener is a prevailing torque lock nut.

8. The apparatus of claim 5 wherein the threaded fastener is a locking fastener.

9. The apparatus of claim 5 wherein the threaded fastener is a thread forming fastener.

10. The apparatus of claim 5 wherein the threaded fastener is a load indicating fastener having an ultrasonic transducer permanently attached to the threaded fastener.

11. The apparatus of claim 5 wherein the threaded fastener is a conventional fastener having an ultrasonic transducer removably applied to the threaded fastener.

12. The apparatus of claim 1 wherein the pneumatic tool includes an electrical contact for engaging an ultrasonic transducer associated with the fastener, and for delivering electrical signals produced by the ultrasonic transducer, for making the load measurements in the fastener, to the electronic control circuit.

13. The apparatus of claim 12 wherein the electrical contact is a spring biased pin positioned to engage head portions of the fastener being tightened by the pneumatic tool.

14. The apparatus of claim 1 wherein the electronic control circuit receives electrical signals from the pneumatic tool for making the load measurements in the fastener.

15. The apparatus of claim 14 wherein the electronic control circuit includes an ultrasonic load measurement circuit, for receiving the electrical signals from the pneumatic tool, and for making ultrasonic load measurements in the fastener responsive to the received electrical signals and during the tightening.

16. The apparatus of claim 1 wherein the air pressure regulator is an electronically controlled air pressure regulator.

17. The apparatus of claim 16 wherein the electronically controlled air pressure regulator is a high-speed regulator valve capable of changing the air pressure delivered to the pneumatic tool in an amount of time between successive impacts.

18. A method for dynamically controlling output power of a pneumatic tool used to tighten a fastener during a tightening cycle, wherein the pneumatic tool is operated responsive to pressurized air delivered to the pneumatic tool at a supplied pressure, and wherein the method comprises the steps of:

coupling an electronic control circuit with the pneumatic tool, and receiving electrical signals from the pneumatic tool for making load measurements in the fastener;

coupling an air pressure regulator with the pneumatic tool, and regulating the air pressure of the pressurized air delivered to the pneumatic tool; and coupling the electronic control circuit with the air pressure regulator, and dynamically controlling the air pressure of the pressurized air delivered to the pneumatic tool by the air pressure regulator responsive to signals received from the electronic control circuit for making the load measurements in the fastener.

19. The method of claim 18 wherein the dynamic control of the air pressure includes the step of stopping the pneumatic tool when the fastener has been tightened.

20. The method of claim 19 which further includes the step of stopping the pneumatic tool by reducing the supplied air pressure to zero.

21. The method of claim 18 which further includes the steps of engaging an ultrasonic transducer associated with the fastener with an electrical contact associated with the pneumatic tool, and delivering electrical signals produced by the ultrasonic transducer, for making the load measurements in the fastener, to the electronic control circuit.

22. The method of claim 21 wherein the fastener is a threaded fastener, and which further includes the step of permanently attaching the ultrasonic transducer to the threaded fastener, providing a load indicating threaded fastener.

23. The method of claim 21 wherein the fastener is a conventional threaded fastener, and which further includes the step of removably applying the ultrasonic transducer to the threaded fastener.

24. The method of claim 18 wherein the electronic control circuit receives electrical signals from the pneumatic tool for making the load measurements in the fastener.

25. The method of claim 24 wherein the electronic control circuit includes an ultrasonic load measurement circuit, and which further includes the steps of receiving the electrical signals from the pneumatic tool, making ultrasonic load measurements in the fastener responsive to the received electrical signals and during the tightening, and controlling the load produced by the pneumatic tool responsive to the ultrasonic load measurements made in the fastener.

26. The method of claim 18 wherein the electronically controlled air pressure regulator is a high-speed regulator valve, and which further includes the step of changing the air pressure delivered to the pneumatic tool in an amount of time between successive impacts of the pneumatic tool.

27. A method for dynamically controlling output power of a pneumatic tool used to tighten a fastener during a tightening cycle, wherein the pneumatic tool is operated responsive to pressurized air delivered to the pneumatic tool at a supplied pressure, and wherein the method comprises the steps of:

receiving electrical signals from the pneumatic tool, and making load measurements in the fastener responsive to the received electrical signals;

regulating the air pressure of the pressurized air delivered to the pneumatic tool responsive to the load measurements made in the fastener; and dynamically controlling operation of the pneumatic tool during tightening of the fastener responsive to the regulated air pressure and the load measurements made in the fastener.

28. The method of claim 27 wherein the measurements are continuously made in the fastener during the tightening.

29. The method of claim 27 wherein the regulating includes the steps of establishing a maximum allowable air pressure setting for the fastener being tightened, and an expected maximum torque for tightening the fastener.

30. The method of claim 29 which further includes the step of starting operation of the pneumatic tool at the maximum allowable air pressure setting for a pneumatic tool which is to quickly tighten the fastener.

31. The method of claim 29 which further includes the step of limiting the maximum air pressure supplied to the pneumatic tool, responsive to an expected torque required for tightening the fastener.

32. The method of claim 29 wherein the fastener is a prevailing torque fastener, and which further includes the steps of reducing rotation speed of the pneumatic tool during rundown of the fastener, to minimize heating effects on the prevailing torque fastener, and thereafter increasing the output power of the pneumatic tool to provide torque for reaching a specified stopping load.

33. The method of claim 32 wherein the rotation speed of the pneumatic tool is reduced by adjusting the air pressure to a predetermined low pressure setting which is sufficient to rotate the fastener until loading commences.

34. The method of claim 33 wherein the output power of the pneumatic tool is increased by increasing the air pressure to a normal tightening pressure when loading of the fastener commences.

35. The method of claim 34 wherein the loading of the fastener commences when a measurement reaches a predetermined minimum rundown setting.

36. The method of claim 34 wherein the air pressure is increased to the predetermined maximum allowable air pressure setting for the fastener.

37. The method of claim 29 wherein the pneumatic tool has a specified capacity, and wherein the maximum allowable air pressure setting for the fastener is based on the capacity of the pneumatic tool.

38. The method of claim 29 wherein the regulating further includes the step of determining a tightening rate for the fastener.

39. The method of claim 38 wherein the tightening rate is determined as an increase in the load over a defined time interval.

40. The method of claim 39 wherein the defined time interval is a period of time for the pneumatic tool to deliver two impacts.

41. The method of claim 38 wherein the tightening rate is the increase in the load over the defined time interval, divided by a target value of the load for the tightened fastener.

42. The method of claim 38 wherein the regulating further includes the step of making a decision to increase the air pressure, to decrease the air pressure, or to leave the air pressure at a current setting, based on the measured load and the tightening rate.

43. The method of claim 42 wherein the decision is made after each load measurement and each tightening rate determination.

44. The method of claim 42 wherein the load measurement and the tightening rate determinations are made continuously, as the fastener is tightened by the pneumatic tool.

45. The method of claim 42 wherein the decision to increase the air pressure, to decrease the air pressure, or to leave the air pressure at the current setting, is made by comparing the measured load and the tightening rate with an optimized load rate for the pneumatic tool.

46. The method of claim 45 wherein the optimized load rate for the pneumatic tool varies according to a type of pneumatic tool to be used.

47. The method of claim 45 which further includes the step of reducing the air pressure delivered to the pneumatic tool, reducing a defined increase in the load per impact as the tightening approaches a stopping value.

48. The method of claim 47 wherein the tightening approaches the stopping value when the tightening is in the range of approximately 90% to 95% of the stopping value.

49. The method of claim 48 wherein the air pressure delivered to the pneumatic tool is reduced to a load increase per impact of less than 2% of the stopping value per impact.

50. The method of claim 47 which further includes the step of reducing the pressure of the pressurized air delivered to the pneumatic tool to zero when the stopping value is reached, stopping the tool before a subsequent impact.

51. The method of claim 50 wherein tightening overrun is maintained to less than 2%.

52. The method of claim 45 wherein the optimized load rate for the pneumatic tool is determined by a predefined power table.

53. The method of claim 52 wherein the decision to increase the air pressure, to decrease the air pressure, or to leave the air pressure at the current setting, is made by indexing a currently measured load into the table.

54. The method of claim 53 wherein the table further includes a minimum rate and a maximum rate for the measured load.

55. The method of claim 53 which further includes the step of incrementing the air pressure setting if the rate for the measured load is less than the minimum rate, or decrementing the air pressure setting if the rate for the measured load is greater than the maximum rate.

56. The method of claim 55 wherein a fast tightening mode is performed by steps including initiating the air pressure setting at a maximum setting, preventing incrementation above the maximum setting, and thereafter, maintaining, decrementing or incrementing power settings according to the table until a target load is reached.

57. The method of claim 55 wherein the fastener is a prevailing torque fastener, and wherein a slow rundown mode is performed by steps including initiating the air pressure setting at a rundown power setting, proceeding until a selected rundown value is reached, and thereafter, increasing the air pressure setting to a maximum tightening power setting, and maintaining, decrementing or incrementing subsequent power settings according to the table until a target load is reached.

58. The method of claim 18 wherein the pneumatic tool is a pneumatic impact tool.

59. The method of claim 18 wherein the pneumatic tool is a pneumatic impulse tool.

60. The method of claim 18 wherein the pneumatic tool is a continuous tightening pneumatic tool.

61. The method of claim 27 wherein the pneumatic tool is a pneumatic impact tool.

62. The method of claim 27 wherein the pneumatic tool is a pneumatic impulse tool.

63. The method of claim 27 wherein the pneumatic tool is a continuous tightening pneumatic tool.

* * * * *